(No Model.)
L. PAGET.
SECONDARY BATTERY.
No. 393,577. Patented Nov. 27, 1888.
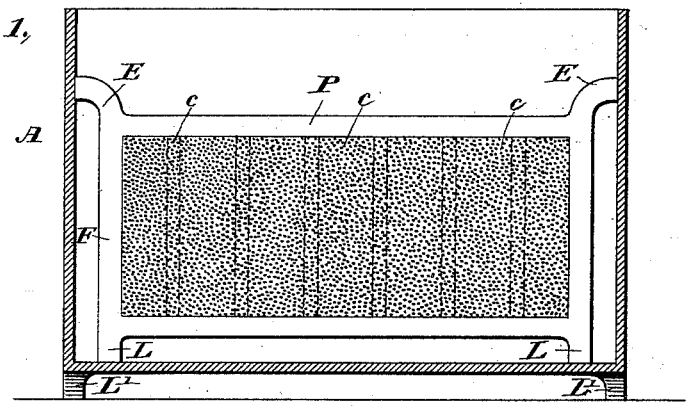
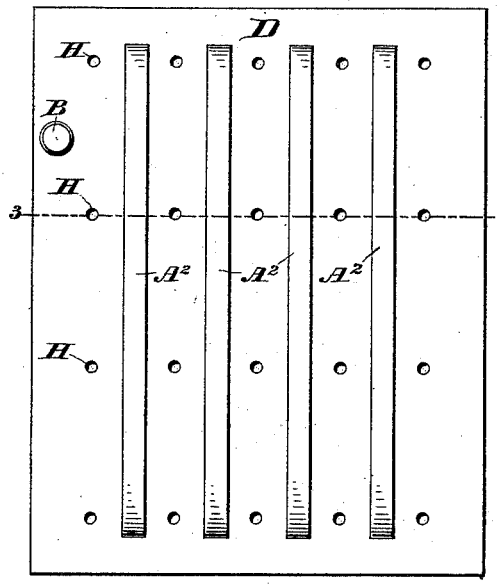
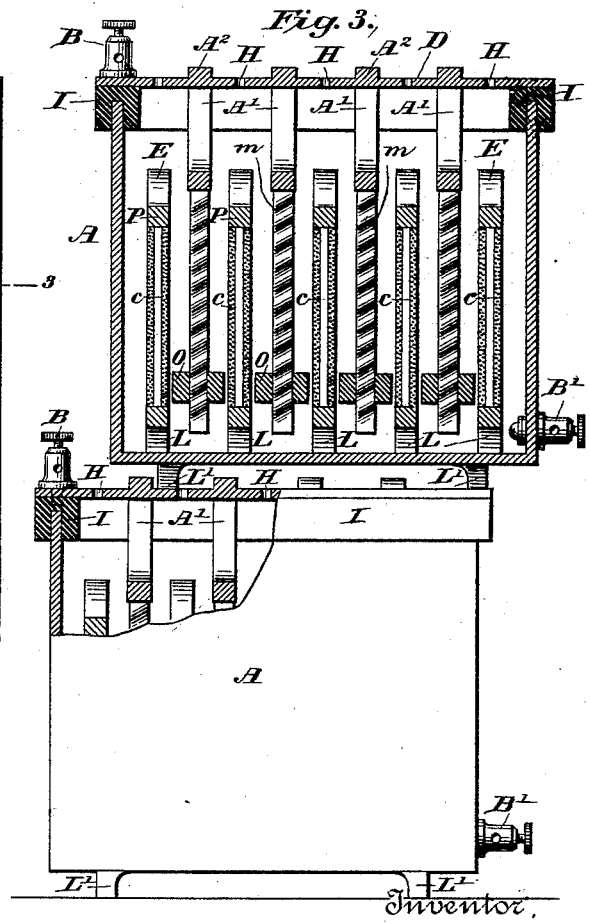
Witnesses
Carrie E. Ashley.
Edward Thorpe.
Inventor
Leonard Paget.
By his Attorneys
Wiedersheim & Kintner.

UNITED STATES PATENT OFFICE.

LEONARD PAGET, OF NEW YORK, N. Y., ASSIGNOR TO THE MACRAEON STORAGE BATTERY COMPANY, OF SAME PLACE.

SECONDARY BATTERY.

SPECIFICATION forming part of Letters Patent No. 393,577, dated November 27, 1888.

Application filed August 30, 1888. Serial No. 284,144. (No model.)

*To all whom it may concern:*

Be it known that I, LEONARD PAGET, a citizen of the United States, residing in New York, county of New York, and State of New York, have made a new and useful Invention in Secondary or Storage Batteries, of which the following is a specification.

My invention relates particularly to a novel arrangement of parts, as hereinafter described. Its objects are, first, to so construct or arrange the elements comprising a storage-battery as to occupy a minimum space; second, to devise a secondary battery having electrodes or plates carrying or supporting the active material held firmly or securely in fixed relation to each other and to the intervening plates of opposite polarity. I accomplish these objects by the construction and arrangement of parts illustrated in the accompanying drawings, described in the following specification, but particularly pointed out in the claims at the end of said specification. It will be fully understood by referring to the accompanying drawings, in which—

Figure 1 is a vertical section taken through my improved secondary battery in a plane parallel to the faces of the electrodes and showing one of that series of the electrodes which carries or sustains the active material, the lid of the jar or box being removed. Fig. 2 is a plan view as seen looking down upon the lid or top of a battery box or jar; and Fig. 3 is a side elevational view, partly in section and partly broken away, showing two cells of my improved battery in operative relation, as well as the interior construction.

In a prior application filed by me in the United States Patent Office May 8, 1888, bearing Serial No. 273,165, I have described and claimed the novel form of electrode shown in Figs. 1 and 3, in which the active material is held on the plate F by ribs *c c* entirely submerged beneath it, and also the novel combination of such an electrode with a corrugated strip electrode, said strips *m m* being held in a suspensory bar of type-metal, A' A', and supported by the sides of the battery-box. I therefore make no claim to such features here, they being shown in the present application only to better exemplify my present improvement, which I shall now proceed to describe.

In the invention referred to as disclosed by my prior application the frames F, carrying the active material, have lugs or ears at their upper sides, which constitute hangers adapted to support said frames by resting on the sides of the battery-box, the intervening corrugated or strip electrodes being similarly held in place, so that the battery as a whole, while adapted for use in places where it is not liable to be disturbed or when used in stationary locations, gives satisfactory results. I find that for use on moving vehicles the electrodes are liable to swing into contact or get displaced. By the present improvement I entirely avoid this objectionable feature and devise a battery having permanent or fixed electrodes practically integral with the battery box or jar.

I construct a battery box or cell, A, preferably of metal—such as type-metal—although it may be made of any good conducting material whatever, the essential feature in this particular being that the battery box, cell, or jar shall itself be a good conductor of electricity. I then prepare a set of electrode-frames supporting or sustaining the active material, preferably of the form disclosed in my prior application above referred to. The ears or lugs E E at the top and the legs L L at the bottom of said frames are then cast, soldered, or otherwise integrally attached to the walls and bottom of the conducting box or cell A, as clearly shown in Figs. 1 and 3. L' L' are legs which are integral with the box A. It will be seen that I provide in this manner a very firm and compact structure, thoroughly braced throughout the whole construction, constituting one electrode, the plates F F being so firmly and securely held at four or more points each, if necessary, that there is no possibility of any shifting from shaking or jostling. In addition, the well-known objectionable feature of buckling is by this means further avoided. This structure constitutes, as I have noted, one electrode, and a binding-post, B', is firmly secured in direct electrical contact with the conducting containing box, jar, or vessel A.

On the upper rim or edge of the box, jar, or vessel I place an insulating-strip, I, preferably of soft rubber, thereby constituting an insulator, as well as an elastic support for the lid and upper electrode-support, which I will now describe. This lid D is made preferably of type-metal, but may, like the box or vessel A, be of any good conductor of electricity. It fits snugly over the insulating strip or collar I, or said strip or collar may be firmly secured to it and made removable from the box with it.

$m$ $m$ $m$ are corrugated strip electrodes cast into supporting-ribs A', as described in my prior application above referred to, and these ribs are in turn cast, soldered, brazed, or otherwise integrally attached to the conducting-lid D at such distances apart as to hang when in place directly between the rigid or fixed electrodes F above described. The lower ends of the corrugated strips are held out of direct contact with the rigid electrodes by the rubber or analogous strips $o$ $o$, interwoven between their ends, as described in said prior application.

$A^2$ $A^2$ $A^2$ $A^2$ are stiffening-ribs running across the lid directly above the bars A' A' A' A'.

B is a binding-post integral with the lid D.

H H H, &c., are ventilating-holes of sufficient diameter to admit a hydrometer to test the specific gravity of the electrolyte. It should be noted here that the electrolyte should immerse or partly immerse the upper bars, A', of the corrugated electrodes, so as to avoid local action on the corrugated strips, or where they join said bars.

In charging this battery the dynamo or other charging source is connected in the usual manner to binding-posts B and B', and in discharging in series the cells are simply set one upon another, as shown in Fig. 3, and the translating devices connected in circuit through both cells from B at the top left-hand side to B' at the bottom right-hand side, the boxes, jars, or cells themselves being directly in circuit.

With a battery of such a construction I find there is little possibility of any short circuit between the electrodes, and that it is particularly adapted for use in vehicles, or has special advantages where it is necessary to often move or disturb the individual cells. My improved arrangement of the electrodes also possesses an additional advantage in that it permits a free circulation of the electrolyte around them.

I am aware that it is broadly old to construct both primary and storage batteries in such manner that the retaining-vessel which carries the solution or electrolyte constitutes one of the electrodes. My improvement does not lie in such feature, as the retaining-vessel is not in fact an electrode in the sense implied—that is, that it is an active element of the battery. I am also aware that it is old to dispose a series of cells made of conducting material, one upon another, and to utilize the conductivity of the cells for connecting them up in series arrangement, such a construction being well known in that form of battery in which the electrodes are "nested." I am also aware that it is old in the art to fix or fasten the electrode-frames carrying the active material to the side walls and bottom of the battery-box; but so far as I am aware the battery-boxes in every instance were of non-conducting material. I therefore make no claim to these broad features.

What I do claim, and desire to secure by Letters Patent of the United States, is—

1. A storage-battery box or vessel made of conducting material, in combination with one or more electrodes integrally attached to its inner walls, substantially as described.

2. A storage-battery box or vessel made of conducting material and having one or more electrodes integrally attached at one or more points on the inside of said box, substantially as described.

3. A storage-battery box or vessel made of conducting material, in combination with a series of conducting supports or frames carrying active material or material adapted to become active, said supports or frames being arranged in planes substantially parallel and having their upper edges connected integrally to the sides of the box, while their lower edges are connected similarly to the bottom thereof, substantially as described.

4. A storage-battery box or vessel made of conducting material, having legs, also of conducting material and integral therewith, substantially as described.

5. A storage-battery box or vessel made of conducting material having one or more electrodes electrically connected thereto, substantially as described.

6. A storage-battery box or vessel made of conducting material having one or more electrodes of one polarity integrally connected to it, in combination with a conducting lid or cover sustaining electrodes of opposite polarity, said lid and box being electrically separated from each other by insulation, the electrodes being immersed in an electrolyte contained in the box or vessel, substantially as described.

7. In a secondary or storage battery, the combination of a battery box or vessel of conducting material supporting one or more electrodes electrically attached to said box, in combination with a conducting lid or cover for said box or vessel supporting one or more electrodes, said box and cover being electrically insulated from each other, and the electrodes immersed in an electrolyte contained in the box, substantially as described.

8. A storage-battery composed of a conducting box or vessel for the electrolyte, having one or more electrodes rigidly secured inside said box, in combination with a conducting-lid insulated therefrom and sustaining one or more electrodes depending between the first-named electrodes and separated therefrom by insulating-strips located near the lower ends of said depending electrodes, substantially as described.

9. A storage-battery composed of a conducting-box having a binding-post, one or more electrodes, and legs integrally connected to it, in combination with a conducting-lid having an additional binding-post and electrodes integrally connected to it, said lid and box being insulated from each other at the points of support for the lid, substantially as described.

10. A lid or cover for a storage-battery consisting of conducting material sustaining or supporting one or more electrodes, in combination with stiffening-ribs extending across the lid, substantially as described.

11. The combination, in a storage-battery, of the following elements: a conducting box or vessel, A, having a series of electrodes, F F, integrally attached to its inner walls and bottom, a conducting-lid, D, having a series of depending electrodes, $m$ $m$, integrally connected to it, with insulating-strips $o$ near their bottom and an insulating strip or band, I, between said lid and box, with binding-posts B B' and legs L' L' integrally attached to the box or vessel, substantially as described.

<div style="text-align:right">LEONARD PAGET.</div>

Witnesses:
S. J. M. BEAR,
J. F. QUINN.